(12) United States Patent
Buchalter et al.

(10) Patent No.: US 6,748,707 B1
(45) Date of Patent: Jun. 15, 2004

(54) UTILITY INTERFACE SYSTEM

(75) Inventors: Mark A. Buchalter, Grand Rapids, MI (US); George V. Weller, Shelbyville, MI (US); Howard M. Montgomery, Grand Rapids, MI (US); Thomas G. Feldpausch, Hastings, MI (US); Douglas L. Bartrand, Belmont, MI (US); Carl V. Forslund, III, East Grand Rapids, MI (US); Arthur Y. Tsubaki, Fort Worth, TX (US); Yasuyuki Hirai, Fukuoka (JP)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/912,071

(22) Filed: Jul. 24, 2001

(51) Int. Cl.[7] .................................................. E04C 2/52
(52) U.S. Cl. ..................... 52/220.1; 52/126.2; 439/131; 439/535
(58) Field of Search ............................. 52/220.5, 220.7, 52/220.1, 126.2, 126.5; 174/48; 439/131, 535, 538

(56) References Cited

U.S. PATENT DOCUMENTS

| | | |
|---|---|---|
| 2,665,147 A | 1/1954 | Wiesmann |
| 2,679,155 A | 5/1954 | Zinn |
| 3,173,443 A | 3/1965 | Saville |
| 3,636,236 A | 1/1972 | Smith |
| 3,681,882 A | 8/1972 | Bettinger |
| 3,784,042 A | 1/1974 | Hadfield et al. |
| 3,811,237 A | 5/1974 | Bettlinger |
| 3,844,440 A | 10/1974 | Hadfield et al. |
| 3,852,928 A | 12/1974 | Raith |
| 3,924,370 A | 12/1975 | Cauceglia et al. |
| 3,938,295 A | 2/1976 | Tate |
| 4,067,156 A | 1/1978 | Downing, Jr. |
| 4,074,488 A | 2/1978 | Ray, III |
| 4,085,557 A | 4/1978 | Tharp |
| 4,091,231 A | 5/1978 | Sotolongo |
| 4,134,636 A | 1/1979 | Kleinatland et al. |
| 4,319,520 A | 3/1982 | Lanting et al. |
| 4,438,610 A | 3/1984 | Fifer |
| 4,536,612 A | 8/1985 | Domigan |
| 4,578,910 A | 4/1986 | Germeroth et al. |
| 4,593,499 A | 6/1986 | Kobayashi et al. |
| 4,596,095 A | 6/1986 | Chalfant |
| 4,630,417 A | 12/1986 | Collier |
| 4,637,181 A | 1/1987 | Cohen |
| 4,685,258 A | 8/1987 | Av-Zuk |
| 4,719,727 A | 1/1988 | Cooper et al. |
| 4,721,476 A | 1/1988 | Zeliff et al. |
| 4,780,571 A | 10/1988 | Huang |
| 4,835,924 A | 6/1989 | Blacklin et al. |
| 4,850,163 A | 7/1989 | Kobayashi et al. |
| 4,864,078 A | 9/1989 | Bowman |
| 4,901,490 A | 2/1990 | Zinniel et al. |
| 4,905,437 A | 3/1990 | Heather |
| 4,922,670 A | 5/1990 | Naka et al. |
| 4,942,708 A | 7/1990 | Krumholz et al. |
| 4,996,804 A | 3/1991 | Naka et al. |
| 5,008,491 A | 4/1991 | Bowman |

(List continued on next page.)

FOREIGN PATENT DOCUMENTS

| | | | | |
|---|---|---|---|---|
| JP | 6-272365 | * | 9/1994 | .......... E04F/15/024 |
| JP | 6-307068 | * | 11/1994 | .......... E04F/17/08 |

*Primary Examiner*—Carl D. Friedman
*Assistant Examiner*—Chi Q. Nguyen
(74) *Attorney, Agent, or Firm*—Foley & Lardner LLP

(57) ABSTRACT

A utility interface system is disclosed for use in a work environment of the type having a floor system. The floor system may be of a type having an access opening and an upper surface. A compartment is configured within the access opening and has a cover. A module is adapted to be received within the compartment. The module can be stowed or concealed within the compartment while not in use and removed from the compartment for use.

53 Claims, 10 Drawing Sheets

U.S. PATENT DOCUMENTS

| | | |
|---|---|---|
| 5,053,637 A | 10/1991 | Dillard |
| 5,057,647 A | 10/1991 | Bogden et al. |
| 5,088,251 A | 2/1992 | Hazeldine |
| 5,122,069 A * | 6/1992 | Brownlie et al. ........... 439/131 |
| 5,123,435 A | 6/1992 | Blacklin et al. |
| 5,285,009 A * | 2/1994 | Bowman et al. .............. 174/48 |
| 5,333,423 A | 8/1994 | Propst |
| 5,345,779 A | 9/1994 | Feeney |
| 5,363,613 A | 11/1994 | Sevier |
| 5,386,670 A | 2/1995 | Takeda et al. |
| 5,389,737 A | 2/1995 | Kobayashi et al. |
| 5,440,841 A | 8/1995 | Greenfield |
| 5,449,859 A | 9/1995 | Bordwell |
| 5,455,388 A | 10/1995 | Pratt |
| 5,467,609 A | 11/1995 | Feeney |
| 5,468,908 A | 11/1995 | Arthur et al. |
| 5,477,649 A | 12/1995 | Bessert |
| 5,483,776 A | 1/1996 | Poppe |
| 5,499,476 A | 3/1996 | Adams et al. |
| 5,501,754 A | 3/1996 | Hiraguri |
| 5,548,086 A | 8/1996 | Greenfield et al. |
| 5,548,932 A | 8/1996 | Mead |
| 5,571,993 A | 11/1996 | Jones et al. |
| 5,627,340 A | 5/1997 | Smith et al. |
| 5,628,157 A | 5/1997 | Chen |
| 5,672,845 A | 9/1997 | Greenfield et al. |
| 5,673,522 A | 10/1997 | Schilham |
| 5,697,193 A * | 12/1997 | Forslund et al. ........... 52/220.5 |
| 5,713,168 A | 2/1998 | Schilham |
| 5,749,188 A | 5/1998 | Belbenoit |
| 5,791,096 A | 8/1998 | Chen |
| 5,796,037 A | 8/1998 | Young et al. |
| 5,828,001 A | 10/1998 | Schilham |
| 5,831,212 A | 11/1998 | Whitehead et al. |
| 5,842,313 A | 12/1998 | Murray et al. |
| 5,901,515 A * | 5/1999 | Chen ........................ 52/220.1 |
| 5,904,015 A | 5/1999 | Chen |
| 5,925,849 A | 7/1999 | Chen |
| 5,927,030 A | 7/1999 | Petit et al. |
| 5,943,833 A * | 8/1999 | Feldpausch et al. .......... 174/53 |
| 5,950,852 A | 9/1999 | Hudspeth et al. |
| 5,953,870 A | 9/1999 | Jette |
| 5,983,582 A | 11/1999 | Vugrek |
| 6,101,768 A | 8/2000 | Springstead et al. |
| 6,102,229 A | 8/2000 | Moncourtois |
| 6,112,483 A | 9/2000 | Murray et al. |
| 6,114,623 A | 9/2000 | Bonilla et al. |
| 6,162,071 A | 12/2000 | Muller |
| 6,202,374 B1 | 3/2001 | Cooper et al. |
| 6,278,061 B1 | 8/2001 | Daoud |
| 6,316,725 B1 * | 11/2001 | Cole et al. .................... 174/48 |
| 6,347,493 B1 * | 2/2002 | Jette ........................... 248/49 |
| 6,367,211 B1 * | 4/2002 | Weener et al. .............. 138/120 |
| 6,379,182 B1 * | 4/2002 | Byrne ........................ 439/574 |
| 6,430,882 B1 * | 8/2002 | Feldpausch et al. ....... 52/220.1 |
| 6,550,195 B1 * | 4/2003 | Cooper et al. ............. 52/220.3 |

\* cited by examiner

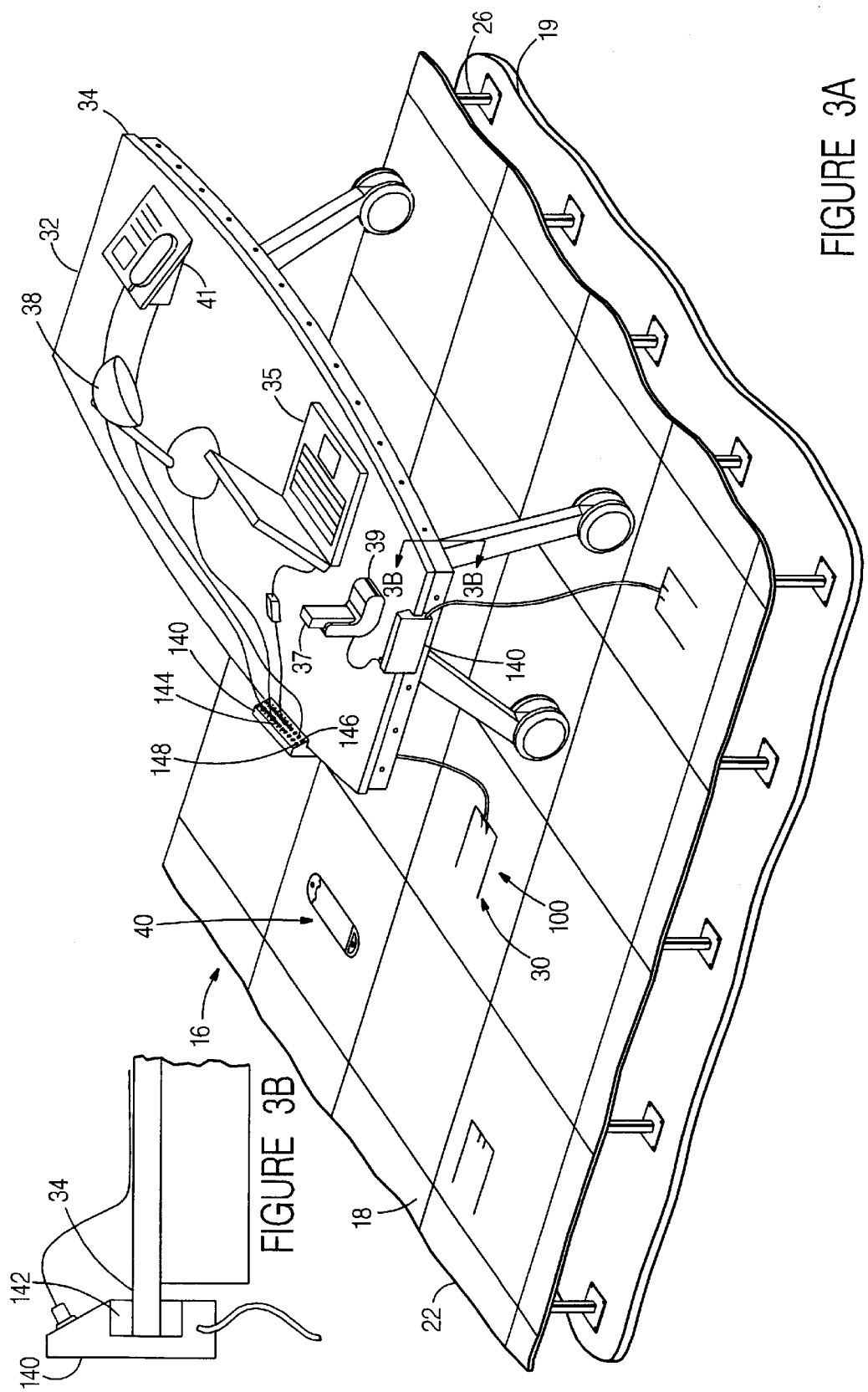

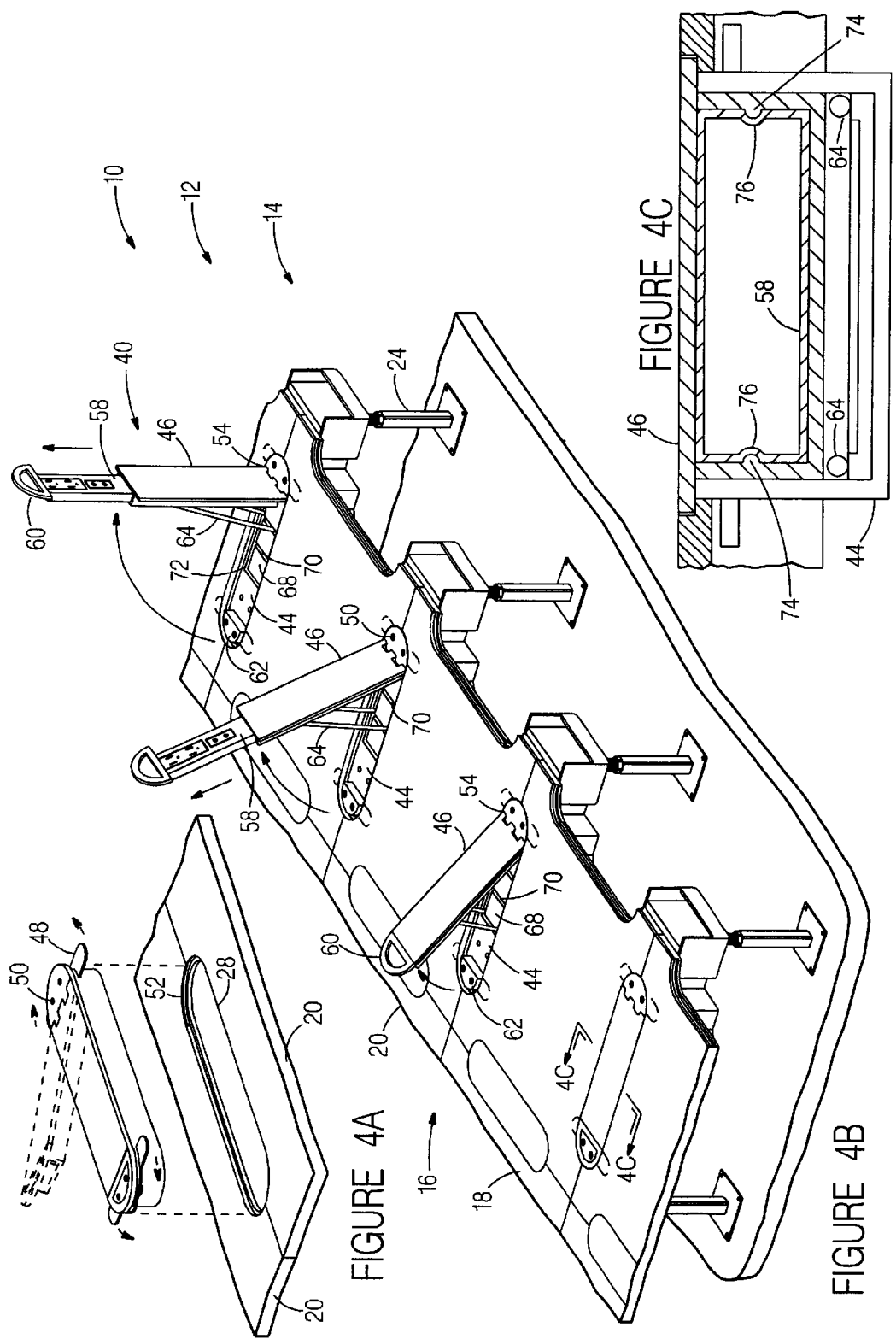

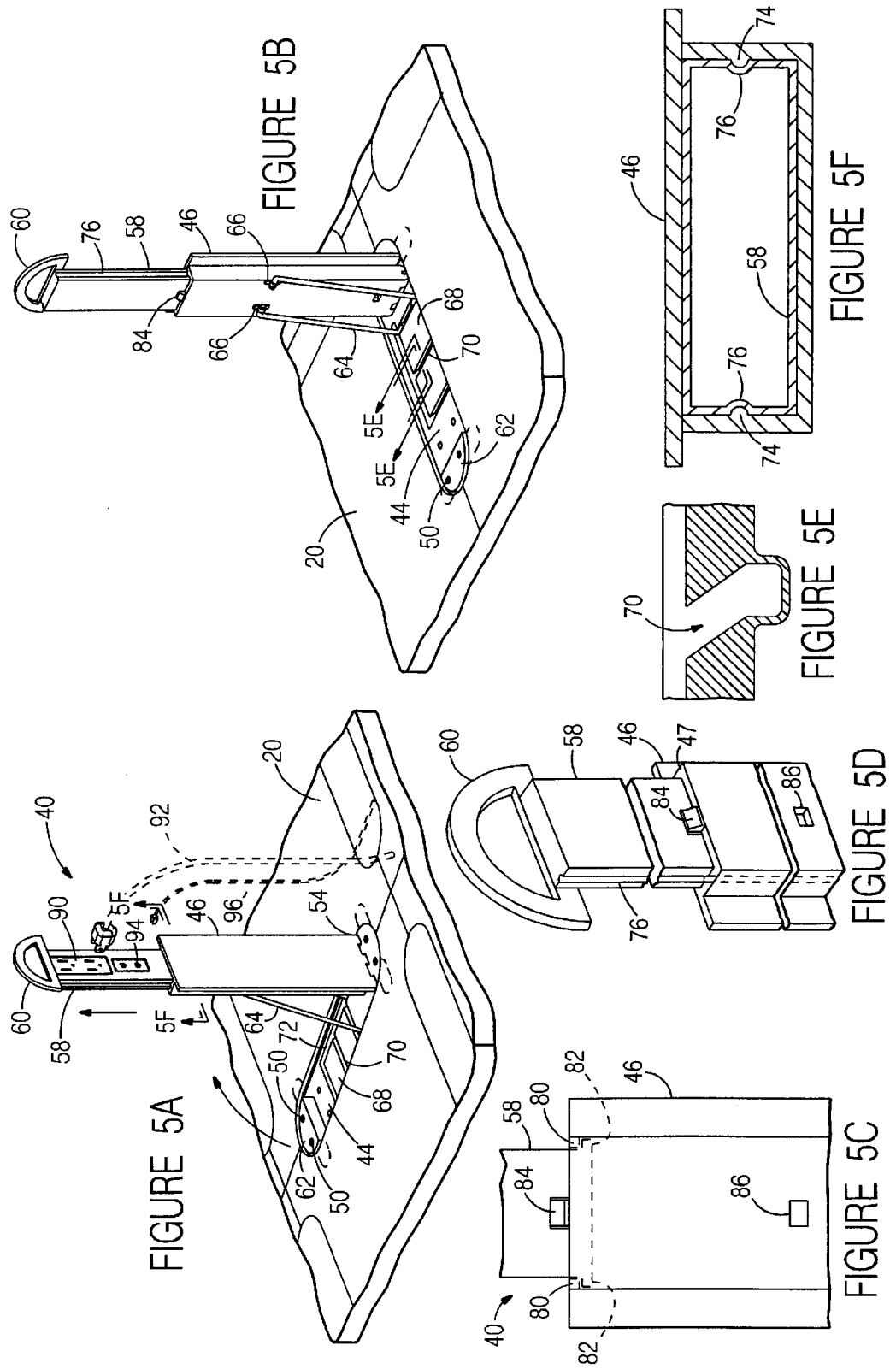

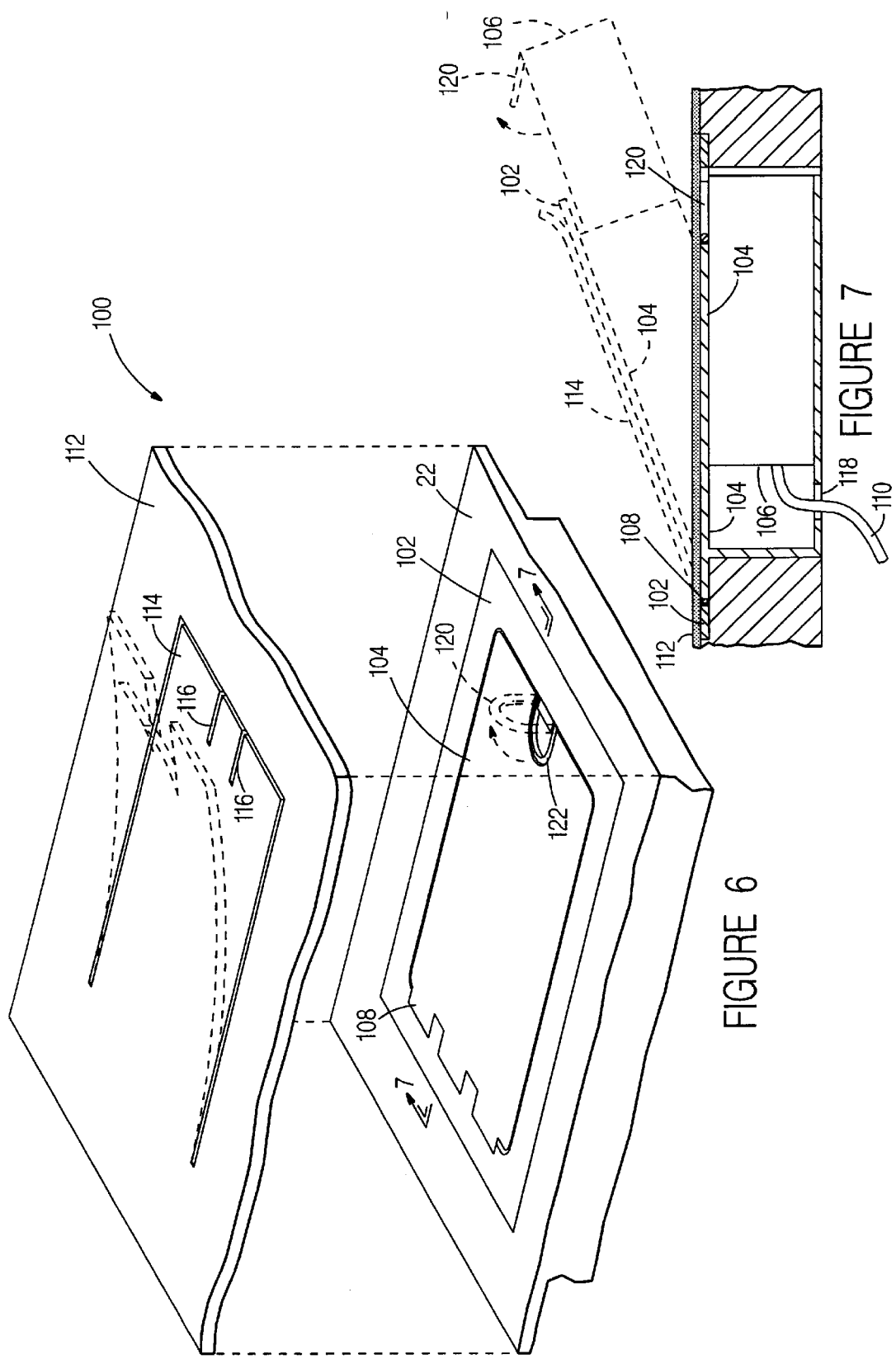

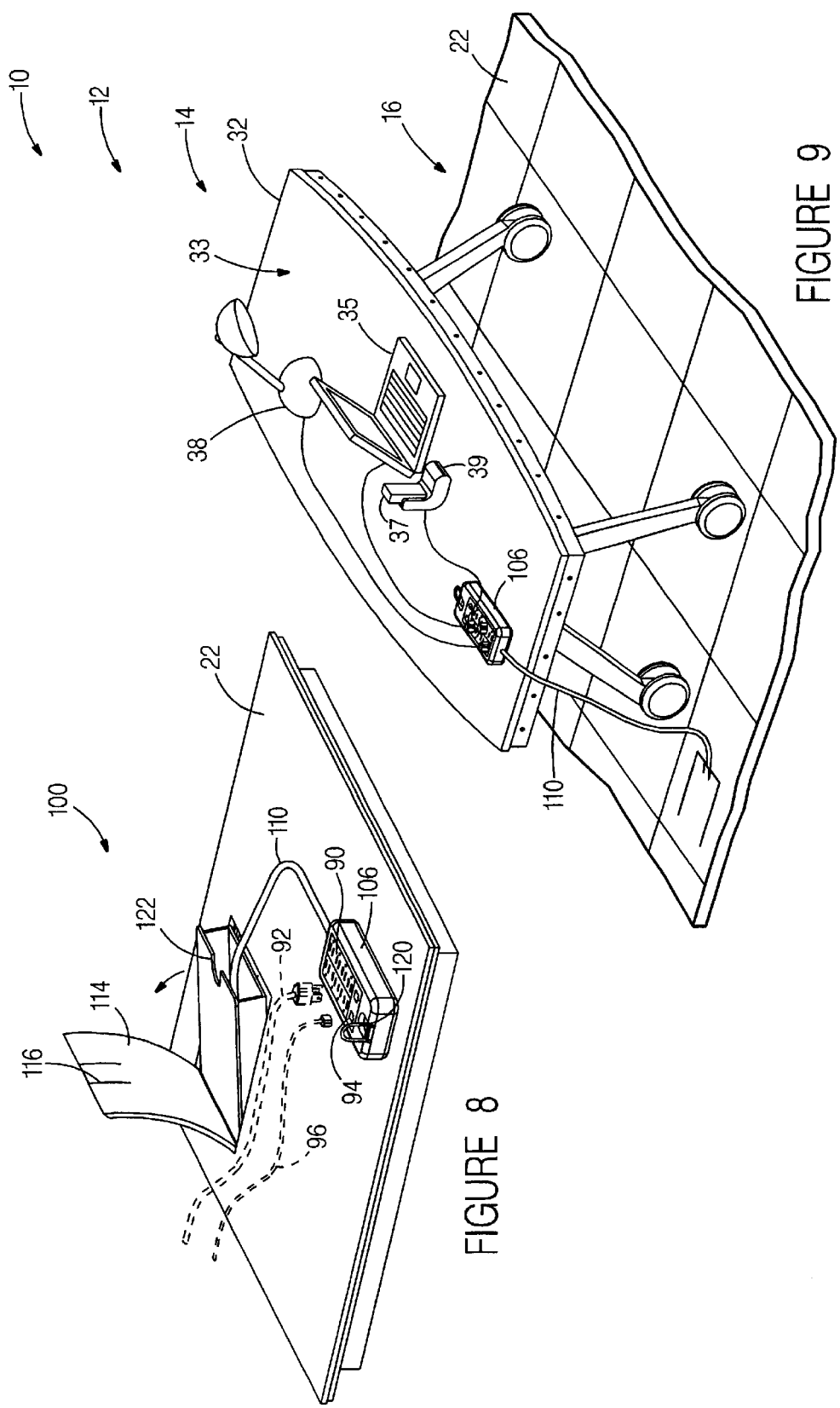

UTILITY INTERFACE SYSTEM

CROSS-REFERENCE TO RELATED APPLICATIONS

The present application is related to the following applications (each incorporated by reference herein): U.S. patent application Ser. No. 09/093,996 titled "Floor System", filed Jun. 9, 1998; U.S. patent application Ser. No. 09/724,298 titled "Floor System", filed Nov. 28, 2000; and U.S. patent application Ser. No. 09/724,486 titled "Floor System", filed Nov. 28, 2000.

FIELD OF THE INVENTION

The present invention relates generally a utility interface system for use in an office or work environment.

BACKGROUND OF THE INVENTION

It is generally known to provide a system for delivering utilities such as power, voice and/or data to devices and equipment within an office or work environment. Such known systems typically provide utility outlets or receptacles for providing access to utilities such as power, voice and data communications. However with such known systems, the position of utility outlets is established during the construction of the work environments (e.g. with utility outlets "hard-wired" within walls and/or floors). Such known systems provide a generally "fixed" arrangement that may be difficult to modify subsequently or may not be well suited to the use in, or the changing needs of, a dynamic work environment. For example, in such known systems extension cords may be used to interconnect devices and equipment requiring passage or cords along floors and walls. Such known systems may also use externally-routed conduit or wire molding along walls and ceilings or within partition panels to route utilities.

Accordingly, it would be advantageous to provide a utility interface system providing for selective placement of access to utilities in a work environment. It would also be advantageous to provide a utility interface system that is readily adaptable to change or modification but yet has a relatively minor impact on the permanent structure. It would also be advantageous to provide for a utility interface system having movable modules or units that may be stowed and concealed when utility access is not required and may be activated and deployed when utility access is required. It would be further advantageous to provide a utility interface system where the modules or units may be configured for installation and use throughout the work environment. It would also be further advantageous to provide a utility interface system where the modules or units may be configured for use in association with various articles of furniture in a work environment.

It would be desirable to provide for a utility interface system providing any one or more of these or other advantageous features.

SUMMARY OF THE INVENTION

The present invention relates to a utility interface system for use in a raised floor system, including a floor panel having an access opening and an upper surface; a compartment configured to fit within the access opening where the compartment has a cover that is substantially flush with the upper surface, and a utilities module adapted to be received within the compartment, where the utilities module can be stored and concealed within the compartment while not in use and the module can be positioned outside of the compartment for use.

The present invention also relates to a floor system having a plurality of floor panels where at least one panel includes an access opening, a plurality of pedestals adapted to support the panels, a compartment configured to fit within the access opening, and a utilities module adapted to be received within the compartment, where the module can be stored and concealed within the compartment while not in use and the module can be positioned outside of the access opening for use.

BRIEF DESCRIPTION OF THE DRAWINGS

FIG. 3A is a perspective view of a utility interface system in a work environment.

FIG. 3B is cross sectional view of a utility terminal in a work environment taken along line 3B—3B on FIG. 3A according to a preferred embodiment.

FIG. 4A is an exploded perspective view of a first utility interface system according to a preferred embodiment.

FIG. 4B is a perspective view of a first utility interface system in various stages of deployment according to a preferred embodiment.

FIG. 4C is a cross sectional view of a first utility interface system taken along line 4C—4C on FIG. 4B, according to a preferred embodiment.

FIG. 5A is a front perspective view of a first utility interface system in a deployed configuration according to a preferred embodiment.

FIG. 5B is a rear perspective view of a first utility interface system in a deployed configuration according to a preferred embodiment.

FIG. 5C is a rear elevation view of a portion of a first utility interface system according to a preferred embodiment.

FIG. 5D is a rear perspective view of a portion of a first utility interface system according to a preferred embodiment.

FIG. 5E is a cross sectional view of a portion of a first utility interface system taken along line 5E—5E on FIG. 5B, according to a preferred embodiment.

FIG. 5F is a cross sectional view of a body for a first utility interface system taken along line 5F—5F on FIG. 5A according to a preferred embodiment.

FIG. 6 is an exploded perspective view of a second utility interface system according to an alternative embodiment.

FIG. 7 is a cross sectional view of a second utility interface system taken along line 7—7 on FIG. 6, according to an alternative embodiment.

FIG. 8 is a perspective view of a second utility interface system in a deployed configuration according to an alternative embodiment.

FIG. 9 is a perspective view of a second utility interface system in a deployed configuration in a work environment according to an alternative embodiment.

DETAILED DESCRIPTION OF THE PREFERRED EMBODIMENTS

Figure 1:
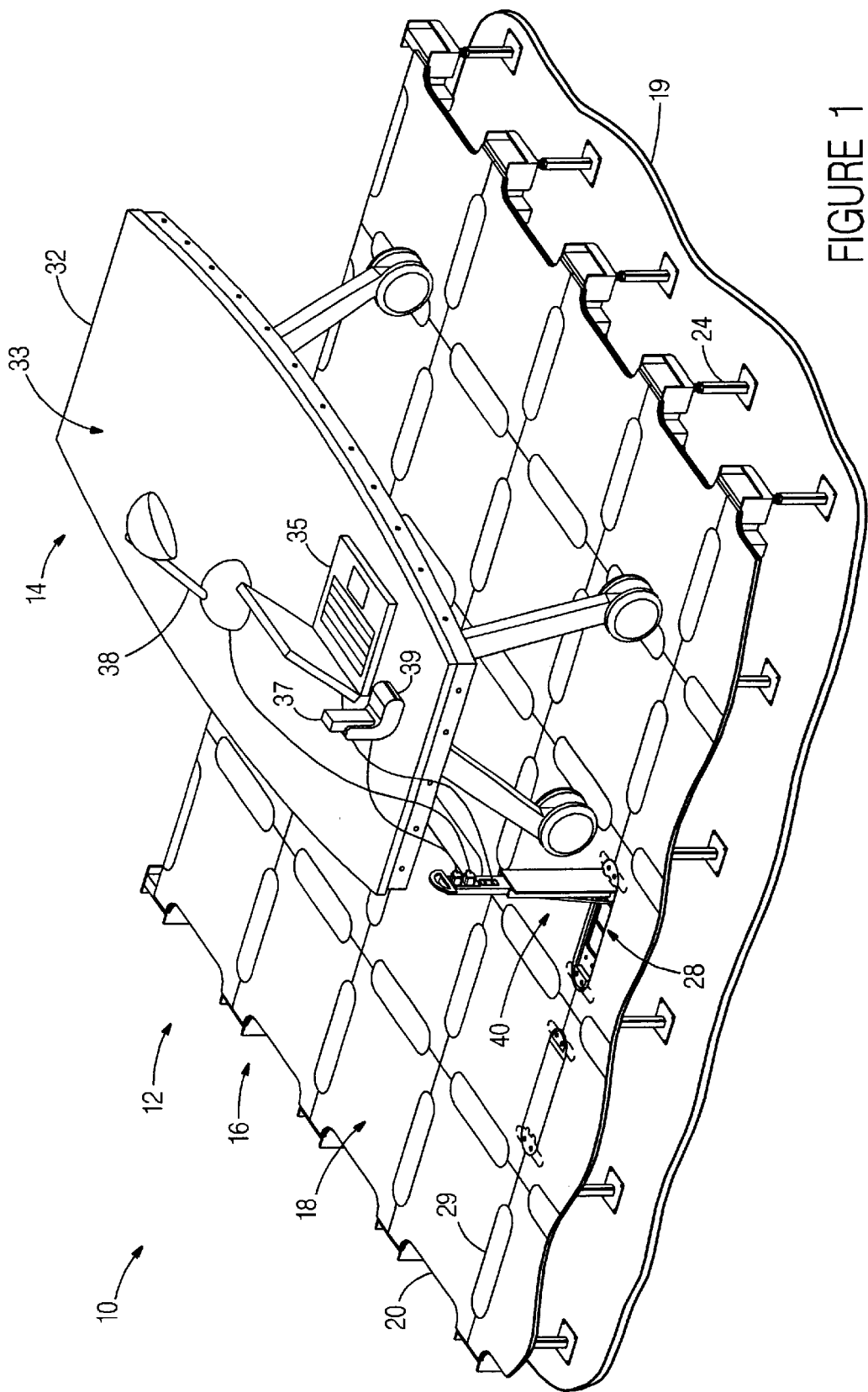
FIG. 1 is a perspective view of a utility interface system in a work environment according to a first embodiment.
Figure 2:
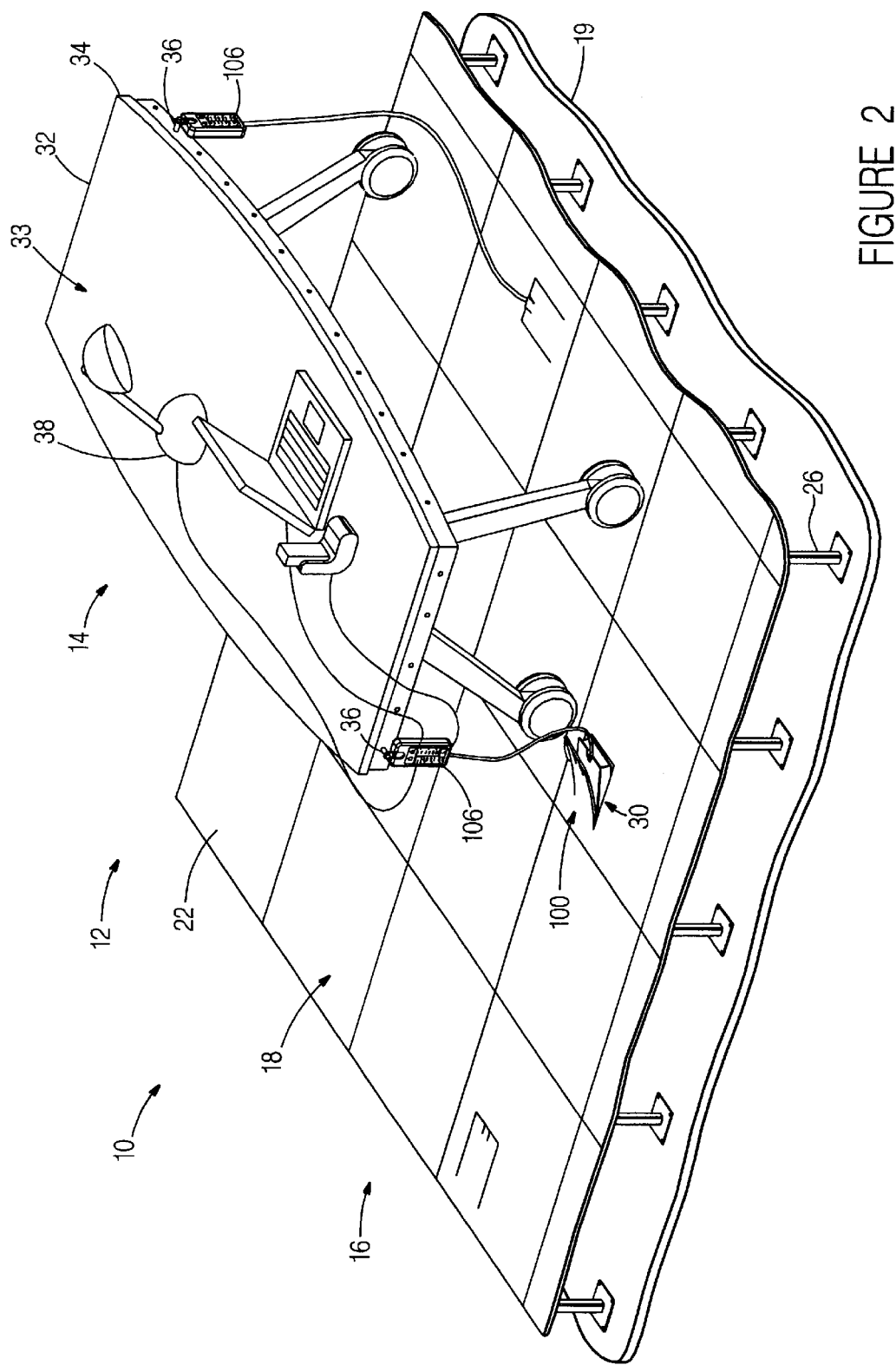
FIG. 2 is a perspective view of a utility interface system in a work environment according to a second embodiment.

Referring to FIGS. 1, 2 and 3, a work environment 10 is shown according to a preferred embodiment. Work environment 10 may include one or more work areas 12 that may contain one or more workstations 14. Work environment 10 includes a raised floor system 16 that provides a floor surface 18 for supporting a variety of items useful in a work environment. The floor system may be of any type configured to provide a raised floor having floor tiles (e.g. floor sections, panels, etc.) supported by pedestals above a base sub-floor. (Exemplary arrangements of a floor system are shown in U.S. patent application Ser. No. 09/093,996 titled "Floor System" which is incorporated herein by reference, and U.S. patent application Ser. No. 09/724,298 titled Floor System" which is incorporated herein by reference, and U.S. patent application Ser. No. 09/724,486 titled "Floor System" which is incorporated herein by reference.) Raised floor 16 includes interchangeable floor tiles or panels 20 or 22 having an upper surface (e.g. outward surface) and a lower surface and access openings 28 or 30 (e.g. cutaways, apertures, etc.). As shown in the FIGURES, a utility interface system installed in (or otherwise associated with) floor system 16 provides for access to utilities (e.g. power, voice, data, etc.).

Referring to FIG. 1, a utility interface system 40 (e.g. terminal, etc.) is shown in a work environment including an article of furniture (e.g. a furniture unit shown schematically as a mobile table 32 providing a worksurface 33) and appliances (shown schematically as a computer 35, a personal digital assistant 37 with station 39 and a lamp 38). Utility interface system 40 is installed within a compartment within floor system 16 (see FIG. 4A). As shown in FIGS. 1, 4B and 5A, utility interface system 40 may be stowed within the floor system or deployed from the floor system for use (e.g. to allow access and/or interconnection of one or more appliances or other equipment or devices to power and/or voice and/or data sources or networks). When stowed, the utility interface system is generally level or "flush" with the surface of the floor provided by the floor system.

Referring to FIGS. 4A through 5F, utility interface system 40 includes a base 44 and a body 46 (e.g. cover panel, etc.). As shown in FIGS. 4A and 4C, base 44 is installed within a recess or access opening 28 in floor system 16. According to a particularly preferred embodiment, base 44 includes tabs 48 which may be rotated by a key or latch mechanism 50 shown schematically in FIGS. 4B, 5A and 5B to engage corresponding slots 52 shown schematically in FIG. 4A within panels or tiles 20 of the floor system to retain and secure base 44 to the floor system. Alternatively, tabs 50 may be configured to engage an underside of floor panel 20. As shown in FIG. 4B, body 46 is coupled to base 44 (e.g. by a hinge mechanism 54 shown schematically in FIGS. 4B and 5A) for pivoting movement between a stowed position and a plurality of fully deployed positions. Body 46 includes a compartment or pocket for housing a module 58 which is configured for translating movement between a stowed position and a fully deployed position. Body 46 and module 58 have a depth suitable for containing a variety of power, voice or data connection devices shown schematically in FIG. 5A as electrical outlet 90 and data connection outlet 94, but can be any suitable device for reception or transmission of power, voice and data signals including wireless technologies (such as infrared, RF, Bluetooth™ systems, etc.).

The power, voice and data connection devices are connected to utility carriers such as wires or cables (not shown) that may include a harness or other bundling device and a quick-disconnect junction or connection device (not shown) for selectively relocating utility interface system 40 in a variety of locations within the work environment. Module 58 includes a handle 60 which is configured to fit over a cap 62 within base 44 and provide a flush floor surface when module 58 is in the stowed position. Body 46 also includes a stand 64 (e.g. with a pivoting coupling 66 shown schematically in FIG. 5B). Base 44 also includes a track 68 with a set of slots 70 which engage the bottom of stand 64 to secure body 46 in any of a set of designated deployed positions (see, e.g., FIGS. 5B and 5E) and a recess 72 allowing stand 64 to retract fully when body 46 is in the stowed position. Body 46 provides a set of guides 74 which define a path of travel corresponding to grooves 76 on module 58 (see FIGS. 5D and 5F). Body 46 also provides a stop 80 which engages tabs 82 on module 58 when module 58 is in the fully deployed position (see FIG. 5C). As shown schematically in FIG. 5D, a catch 84 (e.g. a spring-biased button or the like) is provided to retain module 58 in both the fully deployed position (e.g. on the upper surface 47 of body 46) and in the stowed position (e.g. within an aperture or recess 86).

Referring to FIG. 2, a utility interface system 100 (e.g. terminal, etc.) is shown according to an alternative embodiment. Utility interface system 100 is installed within an access opening 30 in floor system 16 (see FIG. 8). As shown in FIGS. 2, 8 and 9, utility interface system 100 may be stowed within floor system 16 or deployed from the floor system for use (e.g. to allow access and/or interconnection of one or more appliances or other equipment or devices to power and/or voice and/or data sources or networks). When stowed, the utility interface system is generally level or "flush" with the surface of the floor provided by floor system 16.

Referring to FIGS. 6 and 7, utility interface system 100 includes a base 102 providing a body 104 having a compartment or pocket for housing a removable module 106. As shown in FIGS. 2 and 6 through 9, base 102 is installed within a recess or opening 30 in floor system 16. Body 104 is coupled to base 102 (e.g. by a hinge mechanism 108 as shown schematically in FIG. 6) for pivoting movement between a stowed position in which body 104 is generally level (or "flush") with the floor and a fully deployed position in which body 104 is lifted from the floor and access to removable module 106 is provided (see FIG. 7). Removable module 106 communicates with body 104 through a utility carrier shown schematically as a flexible wire or cable 110. Cable 110 may be routed beneath floor system 16 from a utility supply source (not shown) to any desired utility interface system location in the floor system. As shown schematically in FIGS. 6 through 8, a floor covering 112 (e.g. a carpet tile or cover or the like) having a flap 114 may be installed over utility interface system 100. Body 104 includes aperture 118 for allowing passage (e.g. extension or retraction) of cable 110 when module 106 is moved between the stowed and deployed positions. Removable module 106 includes an interface shown schematically as a hook 120 that is accessible through a notch 122 in body 104 to facilitate access and removal of module 106 from body 104. Body 104 may be returned to the stowed position in panel 22 following deployment of module 106 by lowering body 104 into base 102 to provide a smooth floor surface. Cable 110 may extend from beneath floor system 16, through aperture 118 and notch 122 and through one or more slits 116 in flap 114 to allow unobtrusive passage of cable 110 when module 106 is in the deployed position (e.g., laying on the floor, hanging or suspended from an article of furniture such as a desk, etc.) and body 104 is returned to the stowed position.

Figure 10:
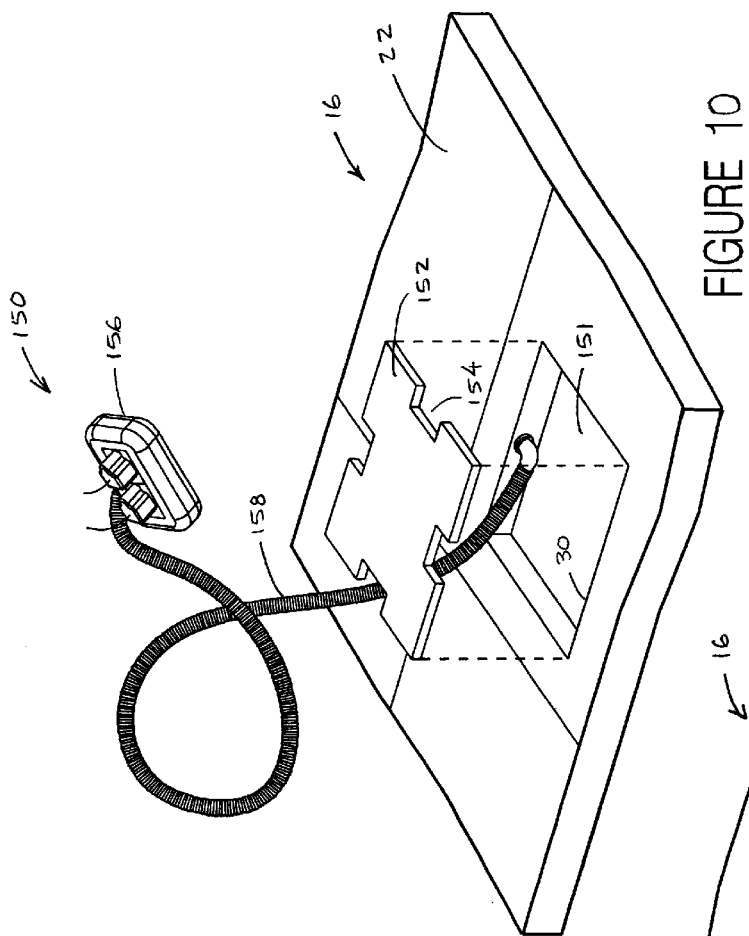
FIG. 10 is a perspective view of another utility interface system according to an alternative embodiment.
Figure 12:
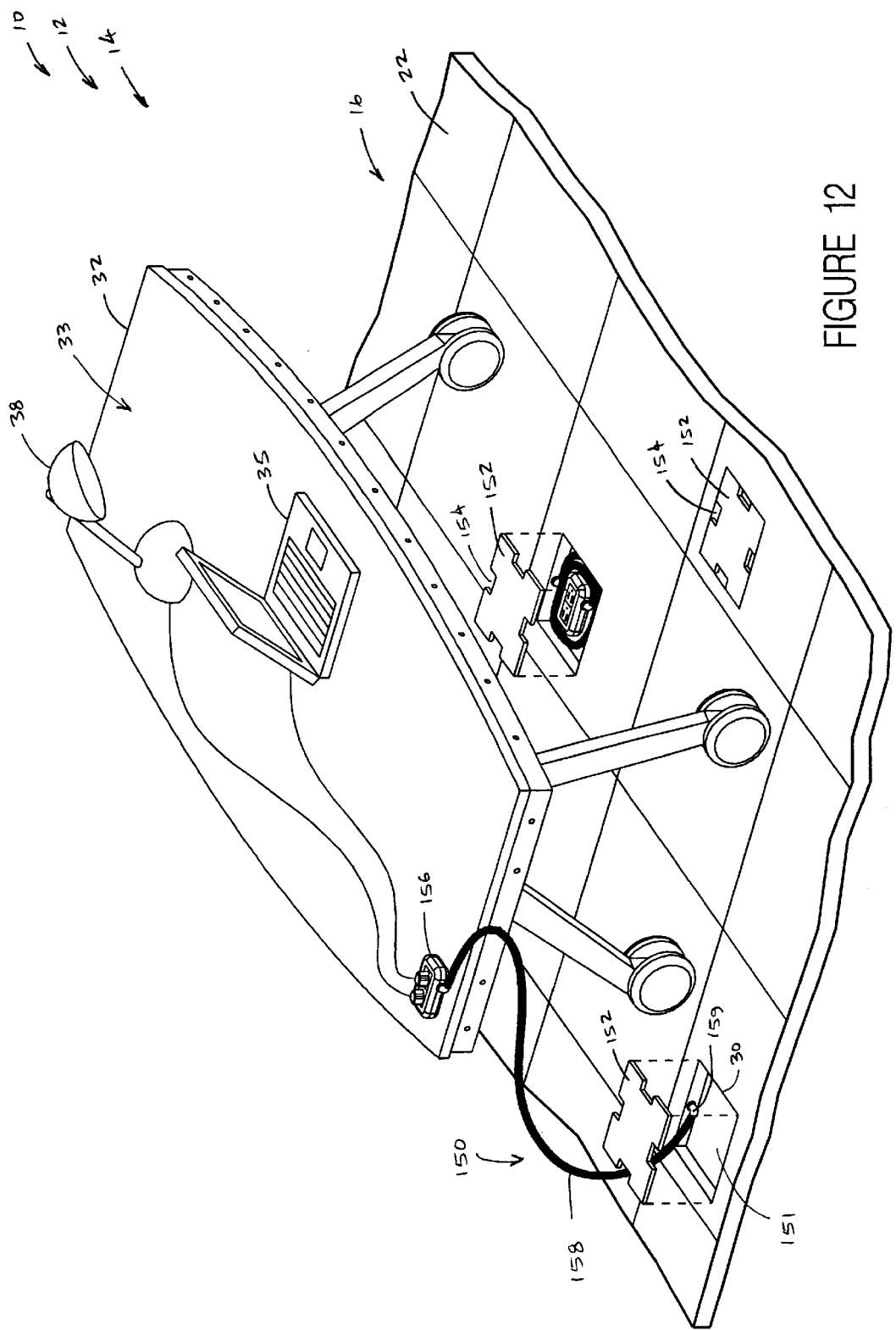
FIG. 12 is a perspective view of the utility interface system of FIG. 10 in a work environment according to an alternative embodiment.

Referring to FIGS. 10 and 12, a utility interface system 150 is shown according to an alternative embodiment. Utility interface system 150 is installed within an access opening 30 in floor system 16 and includes one or more removable modules 156 that may be stowed within floor system 16 or deployed from floor system 16 for use. A cover 152 is provided having one or more apertures 154 along its peripheral edges to allow passage of a cable 158 and covering of access opening 30. Cover 152 is removable to allow access to module 156 as shown in FIG. 12, cable 158 may have a plug or connector 159 that engages an outlet or interface within access opening 30; when stowed, module 156 rests on base 151 of access opening 30. (The cover is typically level or "flush" with the surface of the floor). Module 156 is connected by cable 158 to an under-floor utility distribution system (not shown) that may be within panel 22 or run beneath panel 22. According to a particularly preferred embodiment, cable 158 is semi-rigid and repositionable, for example constructed of a resilient cable material, a spiral-wound material, or any other suitable material for providing flexibility and structural rigidity for adjustably positioning the location of the module in any of a variety of fixed free-standing positions while maintaining support of module 156. In use, the module may selectively or alternatively be placed directly on a floor or placed on, suspended from, affixed to, or otherwise associated with an article of furniture.

Figure 11:
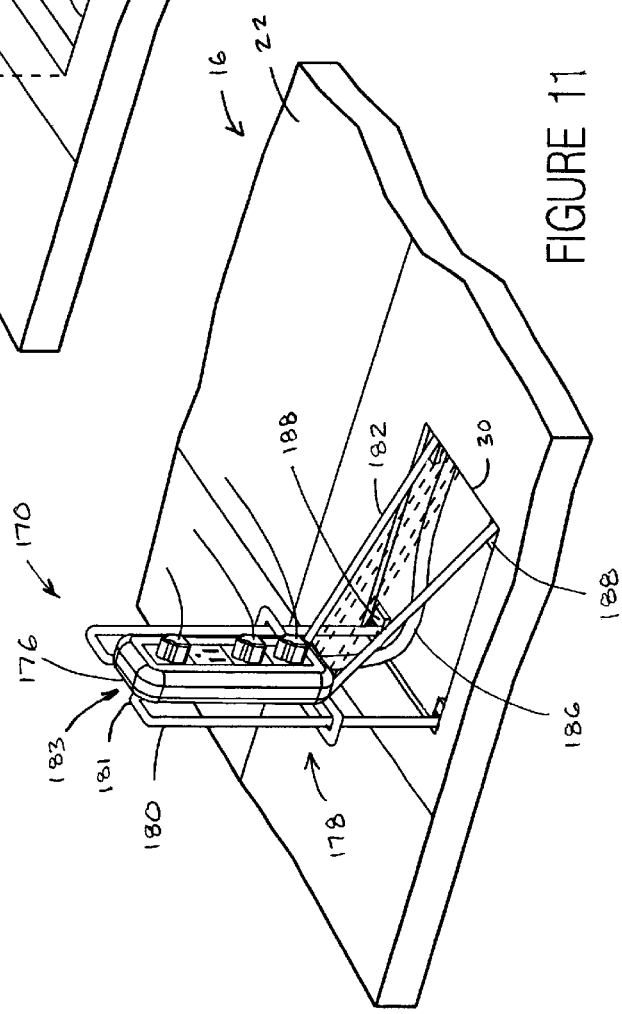
FIG. 11 is a perspective view of a further utility interface system according to an alternative embodiment.
Figure 13:
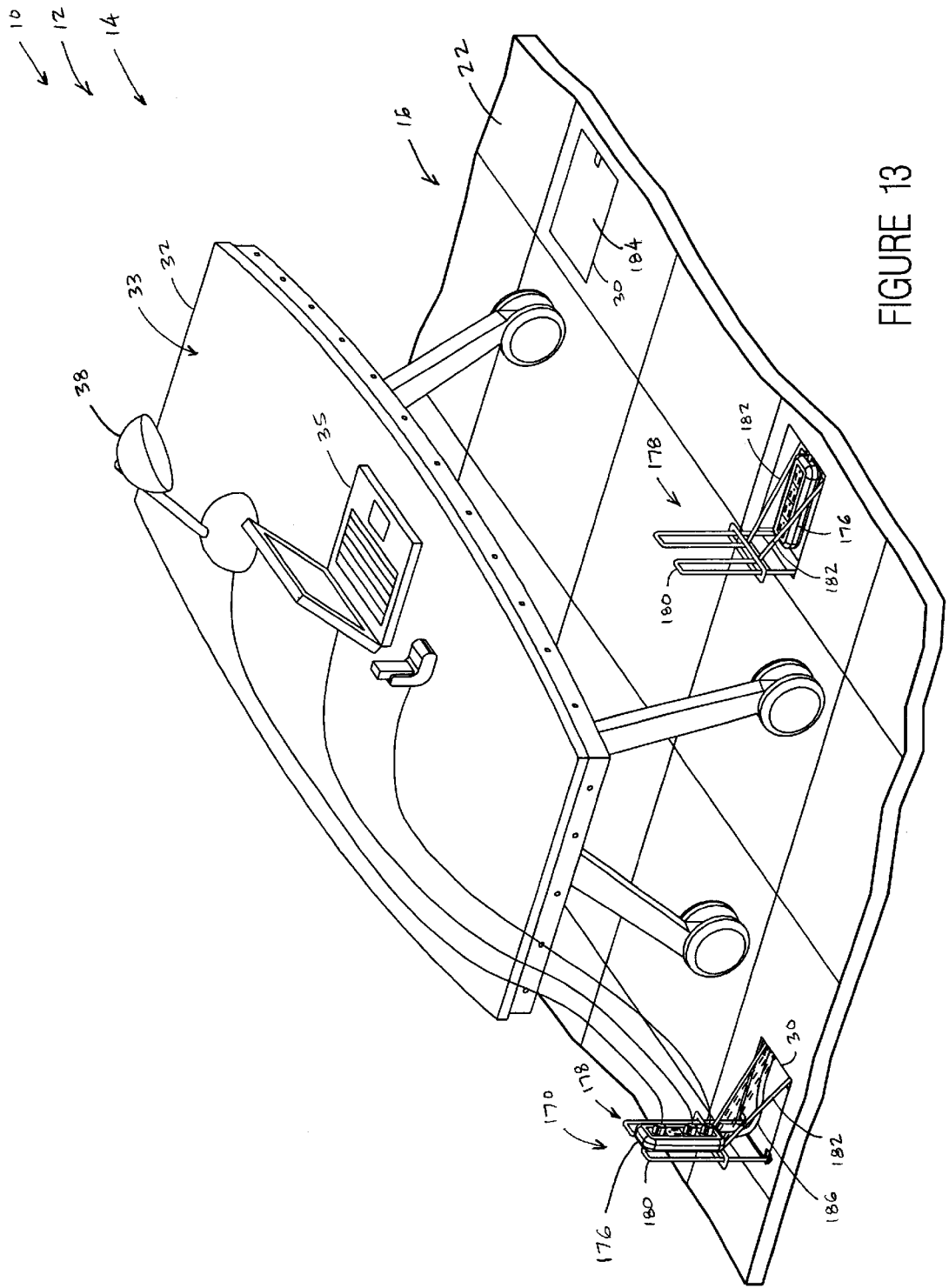
FIG. 13 is a perspective view of the utility interface system of FIG. 11 in a work environment according to an alternative embodiment.

Referring to FIGS. 11 and 13, utility interface system 170 is shown according to an alternative embodiment. Utility interface system 170 is installed within an access opening 30 in floor system 16 and includes one or more removable modules 176 that may be stowed within floor system 16 or deployed from floor system 16 for use. Module 176 may be connected to a cable 186 for delivering utility access from a utility distribution system (not shown) located beneath floor system 16. Utility system 170 includes a support assembly 178 (e.g. support frame, bracket, etc.) having a base frame 180 and one or more braces or legs 182. Base frame 180 and legs 182 may be pivotally mounted (e.g. by a hinge) to access opening 30 or may be removably inserted into apertures provided in ledges or tabs 188 extending outward from the perimeter of access opening 30 beneath cover 184. According to an alternative embodiment, the base frame may be detachably mounted within the access opening 30 or other suitable structure on floor panel 22 using any suitable mounting configuration for rapid installation during system deployment and convenient removal and storage beneath floor system 16 in the stowed position. A cover 184 is configured to cover access opening 30. According to any preferred embodiment, module 176 is removably attachable to base frame 180. According to a particularly preferred embodiment, base frame 180 may have contours such as bends 181 configured to form a slot 183 and module 176 may have a co-acting projection for slidably coupling the module to the base. According to other exemplary embodiments, the module may be coupled to the base frame by any other suitable connecting structure (e.g. by a snap-fit, rotating lock tabs, etc.).

According to any preferred embodiment, the utility interface system may be coupled to or otherwise associated with an article of furniture. As shown in FIG. 2, utility interface system 100 provides a removable module 106 that can be attached to or supported on worksurface 33 provided by table 32 (e.g. through a support or post 36 on table 32 that engages an interface or hook 120 on module 106) as shown in FIG. 9, utility interface system 100 provides a removable module 106 that is supported on worksurface 33 of table 32. As shown in FIG. 8, utility interface system 100 is supported on the surface of floor panel or tile 22 provided by floor system 16. According to an alternative embodiment shown schematically in FIGS. 3A and 3B, utility interface system 100 may include a module 144 configured for selective attachment to, or otherwise associated with, an article of furniture (for example, by an integral "C" shaped channel with a compliant "grip" 142 or clamp or other device or arrangement).

According to any preferred embodiment, the utility interface system will provide terminations or connections for utilities, for example, in the form of one or more outlets or "jacks" for utility carriers (e.g. electric cords, network or data connections, telephone lines, etc.); according to alternative embodiments, the utility interface system may also provide indicators (e.g. status lights) or power conditioning or protection (e.g. surge protection, circuit breakers, fuses or the like). For example, as shown schematically in FIG. 3A, module 140 provides indicator lights 148 and outlets for power connection 144 to a docking cradle 39 (of a type for a cellular or portable telephone or a personal digital assistant) and to a desk lamp 38, a data connection 146 for a computing device (shown as a notebook computer 35), and voice (or data) connections and a power connection to a telephone 41. As shown schematically in FIGS. 5A and 8, modules 58 and 106 may provide conventional electric outlets 90 for an electric cord 92 (shown in phantom lines) and conventional voice/data outlets 94 for a telephone or data cable 96 (shown in phantom lines). It should be noted that according to alternative embodiments of the utility interface system, any of power or voice or data connections suitable for wired or wireless technology may be provided, as well as various combinations of power and/or voice and/or data connections.

According to exemplary embodiments, the utility interface system is stowed within the floor system and deployed from an opening in the raised floor so that utilities may be passed from beneath the raised floor into the work environment above the raised floor. According to any preferred embodiment, the openings may have any suitable shape or size for accommodating a utility interface system. Opening 28 shown in FIG. 1 has an elongated oval shape; opening 30 as shown in FIG. 2 has a rectangular shape. As shown in FIG. 3A, openings 28 or 30 may be within a single floor tile or may be between adjacent floor tiles (as shown in FIG. 1). According to alternative embodiments, the utility interface systems may be similarly configured for installation in an article of furniture or other surface such as a partition, wall or ceiling to provide increased flexibility in creating a utility access pattern in a work environment.

The utility interface systems may be installed at desired locations in the floor system throughout the work area to accommodate the utility needs of one or more workstations and associated workers. An access pattern for the utility interface systems may be created by selective arrangement of the floor panels. The modular nature of the utility interface systems in conjunction with the interchangeable floor panels of the floor system permit customization of the utility interface system and the access pattern to utilities to support improved layout concepts and space utilization designs for increasing the productivity, safety and aesthetic appeal of the work area or the workstation. The floor system may be provided with "blank" covers (such as covers 29 shown schematically in FIG. 1) to cover access openings where utility interface systems are not currently installed. The location of the utility interface systems may be subsequently reconfigured by rearranging the floor panels, covers, and utility interface systems to suit the changing needs of a work environment.

Referring to the FIGURES, workstation 14 may include a variety of items for performing work, including articles of furniture such as table 32 having worksurface 33 with a projecting ledge 34, hangers 36 (e.g. pegs, hooks, etc.) and wheels, but may also include tables, desks, chairs, benches, cabinets, files, shelves, etc. Articles of furniture (such as table 32) may be designed for stationary use or may contain mobility features (e.g. rails, tracks, rollers, hangers, etc.— not shown) for reconfiguring the layout of the workstation. Workstation 14 may also include a wide variety of other communication, computing, data processing, and display devices, etc. that require access to utilities. Appliances may be freestanding or contained on or within an article of furniture. Any preferred embodiments of a utility interface system will be configured to enhance the level of accessibility to utilities within the work environment while reducing the difficulties and potential hazards posed by the traditional need to run long utility carriers throughout a work area.

According to an alternative embodiment of the utility interface system shown in FIG. 4A, tabs 48 may be outwardly fixed at one end of base 44 and maneuvered into opening 28 first, then base 44 may be completely inserted into opening 28 and then tab 48 at the opposite end may be activated to engage slots 52 or the underside of floor tile 20. Handle 60 may be used to upwardly rotate body 46 through a range of zero (0) degrees to ninety (90) degrees about a hinge 54, whereby handle 60 may be pulled to extend module 58 from body 46 into an access position, or handle 60 may be pushed to retract module 58 within body 46 when utility access is no longer desired.

In other alternative embodiments aperture 86 may include additional apertures (not shown) for securing module 58 within body 46 at various partially-extended positions. Latch 84 may have a beveled surface for smooth and slidable engagement with aperture 86 to facilitate extension and retraction of module 58. Furthermore, body 104 may be provided without a hinge, whereby body 104 may be directly inserted and withdrawn from opening 30 in its entirety. Utilities carrier 110 may be provided with a selectively locking take-up reel (not shown) beneath floor system 16 for convenience in returning module 106 to the stowed position.

It is important to note that the construction and arrangement of the elements of the utility interface system as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, the utility interface system may be adapted for use in walls, partition panels, or ceilings in a wide variety of applications including office spaces, data processing rooms, commercial, residential, retail and public facilities, etc. Further, the utility carriers and ports included on the utilities modules may include or accommodate wireless communication technology (including but not limited to infrared, satellite and RF). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A utilities terminal for use in a raised floor system, the utilities terminal comprising:
    a floor tile having an access opening and an upper surface;
    a body adapted to be received within the access opening and positioned to cover the access opening substantially flush to the upper surface;
    a removable module for utilities adapted to be received within the body;
    wherein the module is configured to be stored and concealed within the body below the upper surface while not in use and to be positioned outside of the body above the upper surface for use.

2. The utilities terminal of claim 1 wherein the module is positionable for use at various locations within an office space.

3. The utilities terminal of claim 1 wherein the module is attached to a flexible cable.

4. The utilities terminal of claim 1 wherein the access opening is configured to receive one or more modules for utilities.

5. The utilities terminal of claim 3 wherein the flexible cable has sufficient rigidity to be positioned in a variety of freestanding locations while supporting the module.

6. The utilities terminal of claim 3 wherein the body is adapted to slidingly receive the module.

7. The utilities terminal of claim 3 wherein the module is adapted to engage a furniture unit while in use.

8. The utilities terminal of claim 3 wherein the module is adapted to engage a worksurface while in use.

9. The utilities terminal of claim 1 wherein the body is coupled to the upper surface by a pivot attachment.

10. The utilities terminal of claim 9 wherein the pivot attachment includes a mechanical hinge.

11. The utilities terminal of claim 9 wherein the body is adapted to slidingly receive the module.

12. The utilities terminal of claim 11 wherein the body is configured to be opened to a vertical orientation and thereafter the module may be extended vertically from the body for use.

13. The utilities terminal of claim 12 wherein the body further includes a stop feature to secure the module in the extended position.

14. The utilities terminal of claim 11 wherein the body includes a pocket and the module is adapted to be telescopingly received within the pocket while not in use.

15. The utilities terminal of claim 11 wherein the body is configured to be opened to a vertical orientation and thereafter the module is configured to be moved from a position inside the pocket to a vertical position extending above the body for use.

16. The utilities terminal of claim 15 wherein the body further includes a stop feature to secure the module in the extended position.

17. A floor system which comprises:
a plurality of floor tiles, at least one of the floor tiles providing an access opening;
a plurality of pedestals adapted to support the floor tiles;
a body adapted to be received within the access opening and comprising a cover panel positioned to cover the access opening;
a removable module for utilities adapted to be received within the body;
wherein the module is configured to be stored and concealed within the body while not in use and to be positioned outside of the body for use.

18. The floor system of claim 17 wherein the module is positionable for use at various locations within an office space.

19. The floor system of claim 17 wherein the module is attached to a flexible cable.

20. The utilities terminal of claim 17 wherein the access opening is configured to receive one or more modules for utilities.

21. The utilities terminal of claim 19 wherein the flexible cable is adapted to be positioned in a variety of freestanding locations while supporting the module.

22. The floor system of claim 19 wherein the module is attached to a selectively deployable frame.

23. The floor system of claim 19 wherein the body is adapted to slidingly receive the module.

24. The floor system of claim 19 wherein the module is adapted to engage a worksurface while in use.

25. The floor system of claim 19 wherein the module is adapted to engage a partition panel while in use.

26. The floor system of claim 17 wherein the cover panel is coupled to the upper surface by a pivot attachment.

27. The floor system of claim 26 wherein the pivot attachment includes a mechanical hinge.

28. The floor system of claim 26 wherein the body is adapted to slidingly receive the module.

29. The floor system of claim 28 wherein the cover panel is configured to be opened to a vertical orientation and thereafter the module may be extended vertically from the body for use.

30. The floor system of claim 29 wherein the body further includes a stop feature to secure the module in the extended position.

31. The floor system of claim 28 wherein the body comprises a pocket and the module is adapted to be telescopingly received within the pocket while not in use.

32. The floor system of claim 28 wherein the cover panel is configured to be opened to a vertical orientation and thereafter the module is configured to be slid telescopingly from a position inside the pocket to a vertical position extending above the cover panel for use.

33. The floor system of claim 32 wherein the body comprises a stop feature to secure the module in the extended position.

34. The floor system of claim 17 wherein the pedestals are vertically adjustable.

35. A utility interface system, comprising:
a panel having an access opening;
a compartment configured to fit within the access opening for movement between an access position and a stowed position;
a removable module adapted to be received within the compartment, the module adapted to be stored within the compartment concealed from view when the module is not in use and the module adapted to be at least partially extractable from the compartment so as to reveal the module for use.

36. The utility interface system of claim 35 wherein the compartment is pivotally attached to the panel.

37. The utility interface system of claim 36 wherein the module is attached to a utility carrier.

38. The utility interface system of claim 37 wherein the module is fully extractable from the compartment and positionable for use at various locations within a work environment.

39. The utility interface system of claim 38 wherein the module is adapted to engage an article of furniture while in use.

40. The utility interface system of claim 37 wherein the compartment has an exposed surface that is substantially flush with the outward surface when the module is not in use.

41. The utility interface system of claim 40 wherein the compartment is adapted to slidingly receive the module.

42. The utility interface system of claim 41 wherein the compartment is configured to be outwardly rotated and thereafter the module is configured to be telescopingly extracted from the compartment to one or more extended positions.

43. The utility interface system of claim 42 wherein the compartment further includes a stop feature to secure the module in the extended position.

44. A floor system for providing utility access in a work environment, comprising:
means for supporting a plurality of floor panels above a sub-floor, at least one of the floor panels providing an access opening;
means for pivotally mounting a compartment within the access opening;
means for concealing a removable module within the compartment when access to utilities is not desired;
wherein the module is configured to be extracted from the compartment when access to utilities is desired.

45. The floor system of claim 44 wherein the pivotally mounted compartment is adapted to rotate from the panel in an outward direction only.

46. The floor system of claim 45 wherein the module is attached to a utility carrier, the module further being adapted for use at various locations within the work environment.

47. The floor system of claim 46 wherein the utility module is adapted to engage a partition panel while in use.

48. The floor system of claim 45 further comprising means for selectively maintaining the compartment in one or more outwardly rotated positions.

49. The floor system of claim 48 further comprising means for maintaining the module in one or more extracted positions when the compartment is outwardly rotated.

50. The utility interface system of claim 35 further comprising a wire frame support assembly for engagement of the module.

51. The utility interface system of claim 50 wherein the module is slidably received on the wire frame support assembly.

52. The utility interface system of claim 35 further comprising a cover having at least one opening for passage of a cable.

53. The utility interface system of claim 52 further comprising a plurality of openings.

* * * * *